Oct. 9, 1923.  
H. R. STRAIGHT  
BUILDING CONSTRUCTION  
Filed June 9, 1920
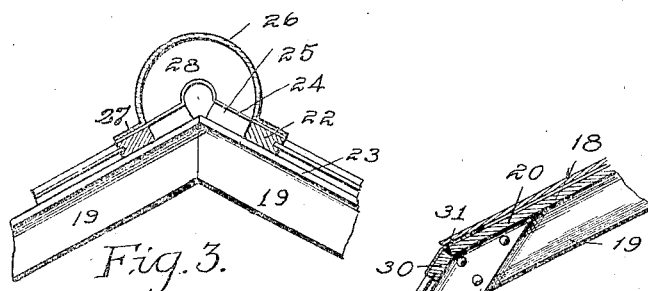
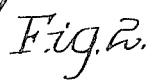
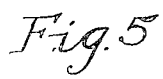
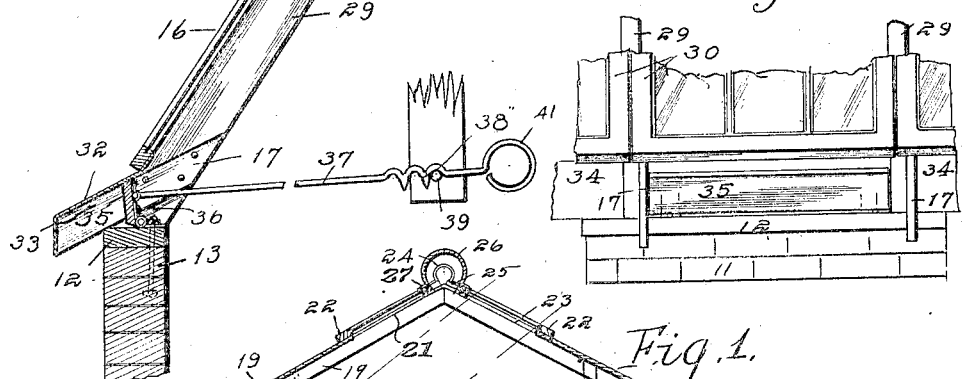
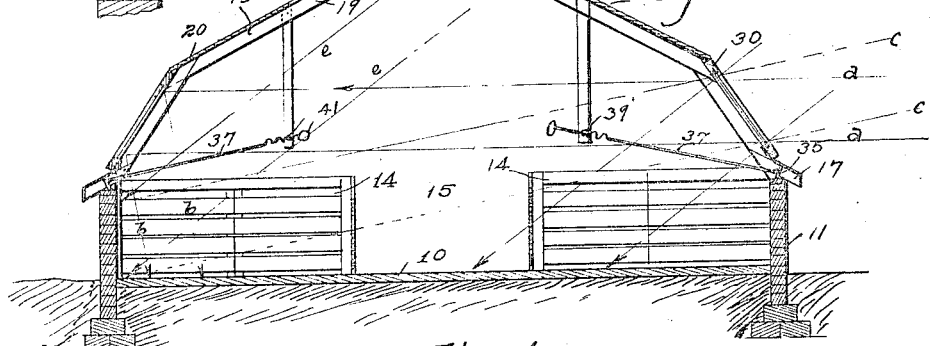
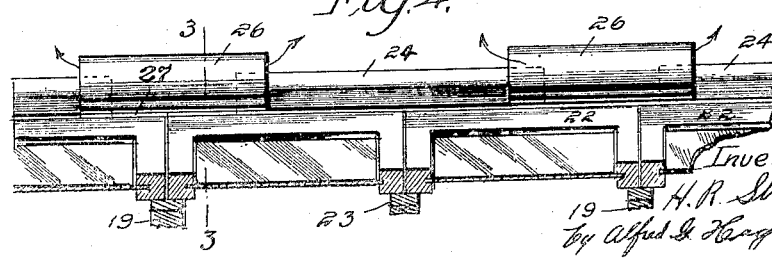
Inventor  
H. R. Straight  
by Alfred G. Hayne atty Patented Oct. 9, 1923.

1,470,298

UNITED STATES PATENT OFFICE.

HALVER R. STRAIGHT, OF ADEL, IOWA.

BUILDING CONSTRUCTION.

Application filed June 9, 1920. Serial No. 387,763.

*To all whom it may concern:*

Be it known that I, HALVER R. STRAIGHT, a citizen of the United States, residing at Adel, county of Dallas, State of Iowa, have invented an Improvement in Building Construction, of which the following is the specification.

This invention relates to improvements in building construction, and particularly to those buildings designed to be used for raising small stock. It is a well known fact to those that are engaged in the raising of fowls and animals that sun light is very essential to their growth as well as their health. It assists in drying the building as well as killing the disease germs. Hog houses are therefore built with a certain amount of glass to admit sun light to the interior, and are generally arranged with a rectangular floor plan, having one or more rows of pens arranged longitudinally and adjacent to the outer wall or walls, with an alley-way at one end of the pens if a single row of pens is used, and with an alley running longitudinal through the center of the building when a double row of pens is used. The latter arrangement is the one to which my invention more particularly relates.

The object of my invention is to provide improvements in the construction of hog houses and similar buildings, to provide them with windows so arranged that a maximum amount of sun light may be admitted to the pens with a minimum amount of glass.

A further object is to provide an inexpensive improved method of setting the windows in the building in such a manner as to prevent leakage of water around them.

A still further object is to so construct and arrange the roof of a building so that a large amount of light might be provided for the pens within and at the same time provide a minimum amount of wall construction.

A still further object is to provide in buildings of the class above mentioned, improved methods of ventilation.

Referring to the accompanying drawings:

Fig. 1 is a sectional view of my improved hog house showing diagrammatically, the manner in which the sun's rays enter the building to the pens within.

Fig. 2 is a detailed view showing one of the lower windows in section and the manner of mounting same; also one of the ventilating devices in section.

Fig. 3 is a detailed section taken on the line 3—3 of Fig. 4.

Fig. 4 is a detailed side elevation of the upper ventilating device and shows part of one of the upper windows in section.

Fig. 5 is a detailed side elevation of a segment of the lower window and supporting wall having the flashing strip removed to show the ventilating door in elevation.

Referring to Fig. 1, the numeral 10 indicates the floor of my improved hog house which may be formed of cement or hollow blocks, or any other suitable building material. The numeral 11 indicates the side walls which are preferably of hollow blocks and substantially 3 feet 6 inches high and provided at its top with the plate member 12, said plate member being secured to the wall by means of bolts 13. The ends are built of masonry similar to the side walls and extend up to the roof and may be provided with suitable doors.

The interior of the building is provided with rows of pens 14 adjacent to each of the side walls. The pens are of such length as to leave a longitudinal alley-way 15 at the center of the building. The pens are of the ordinary construction and need not be described in detail. A gambrel roof is provided for the building. This roof is substantially divided in two parts, which I shall name the upper and the lower portions. The lower portion 16 is built substantially on a three-quarters pitch and provided with outlook rafters 17. The upper portion 18 is built substantially on a one-quarter pitch. The lower portion of the rafter 19 is provided with sheeting 20 which may be covered with any suitable water-proof roofing material. The sheeting and roofing is of such a width as to provide a space 21 near the upper ends of the rafters 19. This space is designed to be covered by a double row window sash 22, the width of said sash being equal to the spacing of the rafters and so arranged that the edges will lie adjacent over the center of each of the supporting rafters, as clearly shown in Fig. 4 of the drawings.

It will be seen by referring to Fig. 1, that by this arrangement, a row of windows is provided on each of the upper roof members near the top, but the length of the window sash is such that they do not touch each other to provide a space between them. This space is for the purpose of providing ventilation, as will be more fully set forth.

A filler strip 23 is provided for each of the rafters 19 near its upper end, and is of a thickness equal to the combined thickness of the sheeting and roofing. This filler strip is designed to carry the ends of the sash in such a manner that the lower edge of the sash 22 will rest on the upper edge of the roofing material, as clearly shown in Fig. 1. The upper edges of each of the rows of sash 22, is provided with a series of semi-cylindrical ridge roll strips 24, the flanged edges of which rest on the upper edges of the sash 22 and are held in position by being nailed to blocks 25 which are in turn nailed to the upper ends of strips 23 (Fig. 3).

The ends of the strips 24 are spaced apart a considerable distance, as shown in Fig. 4, to permit air within the building to circulate upward between them. A semi-cylindrical sheet metal cap 26, having outward extending radial flanges 27 is provided for each opening between the ends of the strips 24 and are of a length considerably greater than the length of said openings. The cylindrical portion of said caps is radially greater than that of the ridge rolls, so that an air space 28 will be provided between the strips 24 and caps 26. By this construction it will be seen that heated air will be permitted to circulate out through the opening 28 and means provided for excluding rain or snow from the interior of the building. The lower end of each of the rafters 29 of the lower portion of the roof 16, is designed to rest on the plate 12 and is provided with an outlook rafter 17. The upper ends of the rafters 29 are secured to the lower ends of the rafters 19 and are considerably shorter. A window sash 30 is provided for each of said rafters 29, and is of a width substantially equal to their length and of a length equal to the spacing of the said rafters 29 (Fig. 5). The upper edges of said sash 30 are placed adjacent to the lower edges of the sheeting in such a manner that a flashing strip of sheet metal 31 may be provided to exclude water or moisture from between the adjacent edges of the roof and window. The upper edge of the flashing strip 31 is placed beneath the lower edge of the roofing material, as shown in Fig. 2. The lower edge of the sash 30 rests on the upper edges of the outlook rafters 17, the said rafters being provided with a flashing strip 32, the upper edge of which is extended under the lower edge of the sash, the lower edge of the flashing strip is extended over the ends of the rafters, as shown in Fig. 2 and secured in position thereto.

By this construction it will be seen that an air space 33 is provided between each of the rafters 17 and the upper side of the plate member 12. These air spaces are used as auxiliary ventilators. I preferably close each alternate space by means of a board 34 and each intermediate space is provided with a door 35, which is secured to the upper face of the plate 12 by means of hinges 36. A rod 37 is pivoted to each of the doors 35 and extends inward and horizontally to a pin 39 near the inner end of each pen. The inner end of each of said rods is provided with a serrated portion 38 designed to rest on said pin. A hand loop 41 is provided at the inner end of the rod 37 for actuating the rod 37 horizontally. The door 35 may be adjusted to admit any desired amount of air and the proper ventilation thereby regulated. By this arrangement a circulation of air may be maintained throughout the building and above the pens in such a manner that the animals will not be in a direct draught. The fresh air passes inward through the opening 33 and settles downward evenly to the floor while the warm foul air within the building, will rise upward and pass out through the opening 28.

One of the important features of my invention lies in the manner in which the light and heat rays are radiated into the pens. This I accomplish by the arrangement of windows, as illustrated in Fig. 1 of the drawings. This building is designed to extend longitudinally north and south, that is, the ridge of the roof will extend north and south, and when so placed, it may be assumed that the sun has risen to a horizonal position and that the rays are reflected parallel with the horizontal lines $a-a$ and in the direction indicated by the arrows. A portion of the light will pass horizontally through the right hand sash 30 and strike the left-hand sash, a portion of which will be reflected downward and inward, as indicated by the lines $b-b$ and engage the floor of the left-hand pens 14. When the sun has risen to a slight angle to the horizontal, as indicated by the lines $c-c$, the sun's rays will pass directly through the right hand sash into the left hand pens. A slight elevation of the sun will bring its rays parallel to the lines $e-e$. The light will then enter both the upper and lower sash, the light passing through the lower sash will enter the right hand pens and that which passes through the upper sash will enter the left hand pens. As the sun rises near to a vertical position, some of its rays will enter the upper left hand row of sash and into the left-hand pens.

Thus it will be seen that sun will enter either one or both rows of pens practically all the time as it is passed from a horizontal to a vertical position. The reverse operation takes place as the sun advances in the afternoon and sun will be reflected to the floor and pens of the interior of the building until almost sundown. This is a very important feature in buildings of this kind when the buildings are used for raising small and young animals.

It will thus be seen I have provided a building in which a very large amount of sun light may be directed to the floors with a minimum amount of glass, and it will also be seen that a very small amount of material is necessary for the wall construction and at the same time plenty of head clearance is provided under the roof. The building is also provided with sufficient ventilation which may be easily and quickly adjusted at the will of the operator.

I claim:

1. A roof construction comprising, a plate, gambrel rafters, an outlook rafter adjacent to the lower end of each of said rafters, a flashing strip over said outlook rafters extending over the outer ends and upward over said rafters, a window sash on each of said rafters, the lower edge of which overlaps the upward extending portion of said flashing strip, a hinged door between each outlook rafter and means for adjusting said door.

2. In a roof construction, a series of spaced rafters, a roofing material covering the lower ends of said rafters of such a width that a space is left between the upper edges of said roofing material, a filler strip on the upper edge of the upper end of each of said rafters of a thickness equal to the thickness of the roofing material, a row of adjoining sash on said filler strips and having their lower edges overlapping the upper edge of said roofing, the upper edges of said rows of sash being spaced apart to form an air passage, a series of spaced ridge roll members overlapping the upper edges of said sash, a second series of ridge rolls greater in diameter than the first said ridge rolls and overlapping the spaces between the said first series of ridge rolls, for the purpose stated.

3. A roof construction comprising, plates, gambrel rafters on said plates, sheeting and roofing for the lower portion of the upper section of said rafters, a filler strip on the upper edge and upper end of each of said rafters of a thickness equal to the thickness of said sheeting and roofing material, a row of sash overlapping each of the upper edges of the roofing sections, the rows of sash being spaced apart to permit air to circulate between them, a series of spaced ridge rolls on the upper and inner edges of said sash, a series of spaced and larger ridge roll strips overlapping the space of the smaller ridge rolls, an outlook rafter adjacent to each roof rafter, a flashing strip on said outlook rafters extending a short distance up said roof rafters, a row of sash on said lower gambrel rafter, the upper edge of said sash resting adjacent to the lower edge of said roofing, a flashing strip under the lower edge of said roofing and overlapping the upper edge of said sash, the lower edge of said sash being designed to overlap the upper edge of the first said flashing strip.

4. A roof construction comprising, plates, gambrel rafters on said plates, sheeting and roofing for the lower portion of the upper section of said rafters, a filler strip on the upper edge and upper end of each of said rafters of a thickness equal to the thickness of said sheeting and roofing material, a row of sash overlapping each of the upper edges of the roofing sections, the rows of sash being spaced apart to permit air to circulate between them, a series of spaced ridge rolls on the upper and inner edges of said sash, a series of spaced and larger ridge roll strips overlapping the space of the smaller ridge rolls, an outlook rafter adjacent to each roof rafter, a flashing strip on said outlook rafters extending a short distance up said roof rafters, a row of sash on said lower gambrel rafter, the upper edge of said sash resting adjacent to the lower edge of said roofing, a flashing strip under the lower edge of said roofing and overlapping the upper edge of said sash, the lower edge of said sash being designed to overlap the upper edge of the first said flashing strip, a pivoted door between each outlook rafter for the purpose stated.

5. A roof construction comprising, plates, gambrel rafters on said plates, sheeting and roofing for the lower portion of the upper section of said rafters, a filler strip on the upper edge and upper end of each of said rafters of a thickness equal to the thickness of said sheeting and roofing material, a row of sash overlapping each of the upper edges of the roofing sections, the rows of sash being spaced apart to permit air to circulate between them, a series of spaced ridge rolls on the upper and inner edges of said sash, a series of spaced and larger ridge roll strips overlapping the space of the smaller ridge rolls, an outlook rafter adjacent to each roof rafter, a flashing strip on said outlook rafters extending a short distance up said roof rafters, a row of sash on said lower gambrel rafter, the upper edge of said sash resting adjacent to the lower edge of said roofing, a flashing strip under the lower edge of said roofing and overlapping the upper edge of said sash, the lower edge of said sash being designed to overlap the upper edge of the first said flashing strip, a pivoted door between each outlook rafter for the purpose stated, and means for adjusting each of said pivoted doors.

6. A roof construction comprising a plate, gambrel rafters, an outlook rafter adjacent to the lower end of each of said rafters, the upper portion of said rafters being covered with sheeting, the lower edge of which is in line with the intersection of the outer faces of the two rafters, a flashing strip covering the top of said outlook rafters having its lower edge extending over the outer ends of said rafters, the lower edge of the downwardly extending portion of which is below the top face of said plate, and the upper edge of said flashing strip extending upwardly on the lower ends of said gambrel rafters, a window sash having its upper edge adjacent to the lower edge of said roofing material, and its lower edge overlapping the upper edge of said flashing strip, a second flashing strip covering the lower edge of said sheeting, and the upper edge of said sash, a course of roofing material over the said sheeting and having its lower edge overlapping the upper edge of said second flashing strip.

HALVER R. STRAIGHT.